(12) United States Patent
Afanasiev

(10) Patent No.: US 9,965,978 B1
(45) Date of Patent: May 8, 2018

(54) AIR CONDITIONER EDUCATIONAL DEMONSTRATION SYSTEM AND METHOD OF OPERATION

(71) Applicant: Michael E Afanasiev, Bradenton, FL (US)

(72) Inventor: Michael E Afanasiev, Bradenton, FL (US)

( * ) Notice: Subject to any disclaimer, the term of this patent is extended or adjusted under 35 U.S.C. 154(b) by 0 days. days.

(21) Appl. No.: 15/383,653

(22) Filed: Dec. 19, 2016

(51) Int. Cl.
| | | |
|---|---|---|
| *G09B 25/00* | (2006.01) | |
| *G09B 25/02* | (2006.01) | |
| *F25B 1/00* | (2006.01) | |
| *G09B 19/00* | (2006.01) | |

(52) U.S. Cl.
CPC .............. *G09B 25/02* (2013.01); *F25B 1/00* (2013.01); *G09B 19/00* (2013.01)

(58) Field of Classification Search
USPC ....... 434/126, 219, 276, 298, 365, 373, 382, 434/383
See application file for complete search history.

(56) References Cited

U.S. PATENT DOCUMENTS

| | | | |
|---|---|---|---|
| 1,547,091 A | | 7/1925 | Baxter |
| 2,329,453 A | | 9/1943 | Brown |
| 3,526,044 A | | 9/1970 | Dwiggins |
| 3,662,561 A | * | 5/1972 | Schroeder ................ F25D 3/10 62/119 |
| 3,694,934 A | * | 10/1972 | Barton .................... G09B 25/02 434/373 |
| 3,785,064 A | | 1/1974 | Thomas |
| 3,802,212 A | * | 4/1974 | Martin .................. F25D 29/001 165/253 |
| 3,934,356 A | * | 1/1976 | Bryant .................... G09B 25/02 434/219 |
| 4,068,391 A | | 1/1978 | Smith |
| 4,623,312 A | | 11/1986 | Crawford |
| 4,776,798 A | | 10/1988 | Crawford |
| 5,178,543 A | * | 1/1993 | Semans .................... G09B 9/00 434/126 |
| 5,421,171 A | * | 6/1995 | Wardle ...................... F25D 3/10 165/4 |
| 5,960,635 A | * | 10/1999 | Dakhil ...................... F17C 7/04 62/48.1 |

(Continued)

*Primary Examiner* — Kurt Fernstrom
(74) *Attorney, Agent, or Firm* — Patent CEO, LLC; Phillip Vales

(57) ABSTRACT

An Air Conditioner Educational Demonstration System is composed of eighteen main components and removable interlocking tubing lines along designated component points. A teacher can disconnect various components and demonstrate characteristics there. The main components are: 1) condenser; 2) gauge port #1; 3) high pressure service valve; 4) gauge port #2; 5) open/close valve #1; 6) gauge port #3; 7) metering device and evaporator; 8) nitrogen pressure port; 9) gauge port #4; 10) open/close valve #2; 11) gauge port #5; 12) low pressure service valve; 13) gauge port #6; 14) compressor; 15) separation valve; 16) low pressure line; 17) high pressure line; 18) nitrogen tank. The system having: a condenser; a compressor; and an evaporator; such that the condenser is removably connected to the evaporator and removably connected to the compressor; and wherein a nitrogen tank is removably connected to the evaporator through a port on the evaporator.

20 Claims, 1 Drawing Sheet

(56) References Cited

U.S. PATENT DOCUMENTS

| | | | | |
|---|---|---|---|---|
| 6,561,810 B1* | 5/2003 | Schellhardt | ............ | G09B 23/12 |
| | | | | 434/126 |
| 2008/0299534 A1* | 12/2008 | Richardson | .............. | G09B 9/00 |
| | | | | 434/383 |
| 2014/0252771 A1* | 9/2014 | Post | ........................ | F25B 11/04 |
| | | | | 290/52 |

* cited by examiner

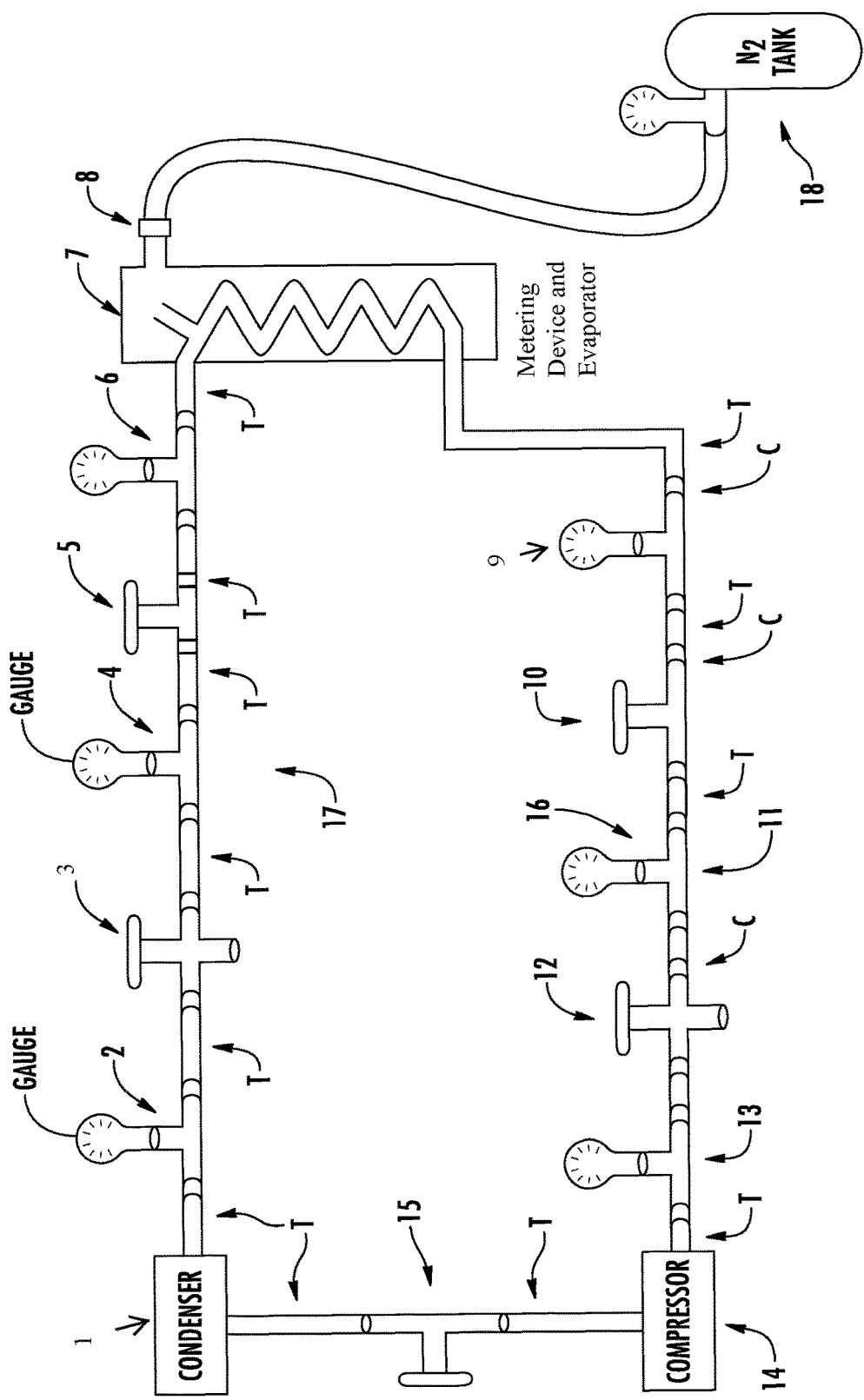

AIR CONDITIONER EDUCATIONAL DEMONSTRATION SYSTEM AND METHOD OF OPERATION

FIELD OF THE INVENTION

The present invention relates to educational devices utilized in demonstrating various subject matter. More particularly, the present invention relates to demonstrating principles of air conditioning utilizing pressurized nitrogen.

BACKGROUND OF THE INVENTION

Service Valves

A service valve is utilized in air conditioning systems to regulate flow therein including full operational flow as well as cutting off the flow of refrigerant therein. Some modes of operation of a service valve have the option of utilizing a gauge to measure pressure at a point in the service valve and when configured appropriately to a loop in the overall system. A typical service valve is composed of four essential parts: 1. Line connection; 2. Compressor connection; 3. Valve stem; 4. Gauge port.

There are three positions in which the valve can be oriented that directly relate to the operational mode of the system: the valve stem out, the valve stem all the way in and finally the valve stem somewhere between the inwards and outwards position. A) If the valve stem is all the way out, the valve is considered to be in the back-seated position. The gauge port is closed and the valve is open, allowing refrigerant to flow through the system in a normal operating mode. B) If the valve stem is all the way in, the valve is considered to be in the front-seated position. The gauge port is open to the compressor connection and the refrigerant line (suction or discharge) connection is closed used for recovery and vacuuming; i.e., pumping system down.

Finally, C) if the valve stem is between the front-seated and back-seated position, it is considered to be in the mid-seated position. In this position all three connections the gauge port, line, and compressor are open. This allows the refrigerant to flow through the system and the system pressure to be read through the gauge port; it is also used for adding or removing refrigerant to the system as well as taking system readings. When placing the valve in its mid-seated position, it is best to have the valve in its back-seated position first and then turn the valve stem only one or two turns into the mid-seated position.

It should be appreciated that this type of service valve is useable with other devices connected thereto to its available ports. Additionally, the drawings are for purposes of exemplary illustration alone and that the corresponding threading of the valve stem for motion within the wall body of the valve is understood.

Gauge Port

A gauge port is a standardized device that typically has two access connections permitting the entry and exit of fluids therethrough. The port also has a point whereby a gauge measurement device can be connected thereto to enable the metering of pressure at the point of contact. There are various standardized gauge devices that are connectable to a gauge portion such as the Bourdon pressure gauge.

Manifold

A manifold is a pressure metering device having various valves and attachment points. A typical manifold comes with at least two valves and three attachment points to measure the high and low side pressure by attaching hoses to appropriate ports thereon and opening and close valves appropriately.

Prior Art Air Conditioning Educational Systems

Several demonstrator models exist in the air conditioning educational system prior art for effectively educating students as to several operational properties of air conditioning systems. Amongst these are the following US patents:

U.S. Pat. No. 1,547,091 to Baxter teaches a demonstrating device having a comparatively thin portable base having a representation of a refrigerator upon one of its sides, a fluid tight container detachably secured to one side edge of said base, said container having a duct communicating with its interior, a valve for controlling said duct, a conductor extending from said duct over the representation aforesaid, and means for said duct.

U.S. Pat. No. 2,329,453 to Brown teaches a refrigerator demonstrator comprising a replica of a household refrigerator cabinet having a door, an inner wall of said cabinet facing said door bearing a representation of a refrigerating system, and at least a portion of said wall being translucent so that light may pass therethrough from the rear to illuminate a corresponding portion of said representation.

U.S. Pat. No. 3,526,044 to Dwiggins teaches an automotive air conditioning system for simulating both normal and defective operation of a typical automobile air conditioning unit and various components thereof. The apparatus is scaled for portability and to be fully operated by commonly available electrical service through conventional outlets.

U.S. Pat. No. 3,694,934 to Barton teaches cooling system demonstrator means for demonstrating the action of a vehicle cooling system are disclosed comprising means for forcing liquid without heating the same under pressure into a vehicle radiator to simulate the heating and expansion of said cooling system from engine heat and means for withdrawing liquid without heating the same under suction from said radiator to simulate the cooling of said cooling system to ambient temperature.

U.S. Pat. No. 3,785,064 to Thomas teaches a method and apparatus for simulating the normal and abnormal operating conditions in an air-conditioning system comprising a plurality of mechanically and electrically operated working units functionally interconnected into a thermodynamic loop, including a plurality of simulating components responsive to control signals from a central control station for simulating desired conditions. The station includes a female receptacle for receiving a programmed plug-in board thereby automatically and simultaneously affecting the state of energization of certain of the simulating components and working units whereby certain of the working units will operate in an abnormal mode.

U.S. Pat. No. 3,934,356 to Bryant teaches a system of teaching a skill for service and repair of heating and air conditioning equipment, a teaching aid which incorporates a closed chamber, preferably insulated, which receives therein the air distribution portion of a heating and air conditioning system. The apparatus utilizes a complete miniaturized refrigerant system which has a sealed compressor unit, an evaporator, a condenser, and the appropriate lines connecting the various components. In the preferred embodiment, a removable skid mounted base supports the condenser and compressor.

U.S. Pat. No. 4,068,391 to Smith teaches a demonstration device for simulating the operation of a heat pump system comprising a schematic representation of a heat pump system, a plurality of lamps and associated electrical circuitry adapted to illuminate portions of the schematic representation to simulate the operation of the heat pump system in various modes of operation, and to simulate refrigerant flow and the phase state and temperature of the refrigerant at different places in the system, and associated explanatory panels for alternatively demonstrating the operation of the electrical circuitry of the heat pump system, or indicating the mode of operation of the system.

U.S. Pat. No. 4,623,312 to Crawford teaches a module for use in a training system assembly which includes a power base is multi-sided and includes mechanical-electrical feet on one side for jacking the module into the power base or into a second module. Detent spring latches are disposed on another side of the module for receiving the feet of a second module atop the first module. The module is hollow and an electrical component is mounted therein. The component is an electrical connection with the feet and the detent spring latches. A display is on a third side of the module and the rear of the module includes a fault selector switch which causes the component to be in either an operating configuration or a fault configuration.

U.S. Pat. No. 4,776,798 to Crawford teaches a changeable modular training system disclosed in U.S. Pat. No. 4,623,312 being extended to include an energy management microprocessing unit, i.e. CPU, a keyboard, a video screen, a remote sensor, and a microprocessing interface unit, to create an energy management microprocessing training system. These added components are formed in the same size modules and/or are interconnected, where needed, by the same electrical connectors and the same peg and slot supports as used in the changeable modular training system. This energy management microprocessing training system is used when students are taught how to program, operate, install, service, and troubleshoot mechanical and electronic control systems in a classroom, when using simulated control systems.

However, prior demonstrators such as U.S. Pat. No. 3,934,356 to Bryant typically have a refrigerant or other liquid therein that can harm students if a line is removed causing frostbite. Additionally, most do not have a complete picture of various operating points in the cycle. Thus, none of these provide for a simple way of demonstrating the air conditioning system in such as manner that the user does not have a high potential for being damage by frostbite.

Additionally, an effective air conditioning educational system would need to be able to teach Recovery, Recycling, Vacuuming, Standard Pressure Test and Charging of the system. None of the prior art devices and or systems provide these useful features and therefore do not completely educate a student as to the aforementioned.

Accordingly, there is a need to overcome the aforementioned problems.

SUMMARY OF THE INVENTION

The present invention overcomes the deficiencies of the known art and the problems that remain unsolved by providing a novel Air Conditioner Educational Demonstration System And Method Of Operation:

An air conditioner educational system comprising:
a pseudo condenser removably attachable to
a pseudo evaporator through
a first valve removably connected to the pseudo condenser and to the pseudo evaporator through associated tubing.
In another aspect further comprising:
a pseudo compressor removably connected to the pseudo condenser through a second valve and associated tubing and wherein the pseudo compressor is removably attachable to the pseudo evaporator through a third valve and associated tubing.

In another aspect wherein the system further comprises:
a fourth valve removably connected to the third valve and removably connected to the pseudo evaporator through associated tubing.

In another aspect further comprising:
a first gauge port connected between the third valve and the pseudo compressor through associated tubing.

In another aspect further comprising:
a second gauge port connected between the fourth valve and the pseudo compressor through associated tubing.

In another aspect further comprising:
a second valve removably connected to the first valve and to the pseudo evaporator.

In another aspect further comprising:
a first gauge port removably connected between the pseudo condenser and the first valve through associated tubing.

In another aspect further comprising:
a second gauge port removably connected between the first valve and the second valve through associated tubing.

In another aspect further comprising:
a third gauge port removably connected between the second valve and the pseudo evaporator through associated tubing.

In another aspect further comprising:
a fourth valve removably connected to the third valve and to the pseudo evaporator.

In another aspect further comprising:
a first gauge port removably connected between the pseudo compressor and the third valve through associated tubing.

In another aspect further comprising:
a second gauge port removably connected between the third valve and the fourth valve through associated tubing.

In another aspect further comprising:
a third gauge port removably connected between the fourth valve and the pseudo evaporator through associated tubing.

In another aspect further comprising:
a nitrogen tank removably connected to the air conditioner educational system and configured to add pressurized nitrogen to the system.

An air conditioner educational system comprising:
an inoperative pretend condenser: an inoperative pretend compressor: and an inoperative pretend evaporator: such that
the inoperative pretend condenser is removably connected to the inoperative pretend evaporator and removably connected to the inoperative pretend compressor: and wherein
a nitrogen tank is removably connected to the inoperative pretend evaporator through a port on the inoperative pretend evaporator and configured to add pressurized nitrogen to the system.

An air conditioner educational system comprising:
a simple empty container compressor removably attachable to
a simple empty container evaporator through
a first valve removably connected to the simple empty container compressor and
to the simple empty container evaporator through associated tubing.
In another aspect further comprising:
a simple empty container condenser removably connected to the simple empty container compressor through a second valve and associated tubing and wherein the simple empty container condenser is removably attachable to the simple empty container evaporator through a third valve and associated tubing.

In another aspect wherein the system further comprises:

a fourth valve removably connected to the third valve and removably connected to the simple empty container evaporator through associated tubing.

In another aspect further comprising:

a first gauge port connected between the third valve and the simple empty container condenser through associated tubing.

In another aspect further comprising:

a second gauge port connected between the third valve and the fourth valve through associated tubing.

In another aspect further comprising:

a third gauge port connected between the fourth valve and to the simple empty container evaporator through associated tubing.

In another aspect further comprising:

a nitrogen tank removably connected to the air conditioner educational system and configured to add pressurized nitrogen to the system.

These and other aspects, features, and advantages of the present invention will become more readily apparent from the attached drawings and the detailed description of the preferred embodiments which follow.

BRIEF DESCRIPTION OF THE DRAWINGS

The preferred embodiments of the invention will hereinafter be described in conjunction with the appended drawings provided to illustrate and not to limit the invention, in which:

FIG. 1 presents a system level diagram of An Air Conditioner Educational Demonstration Device.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each FIGURE.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 presents a system of Refrigeration level diagram of An Air Conditioner Educational Demonstration System. This System is composed of eighteen main components as well as removable interlocking tubing lines along designated component points throughout the system. Thus, a teacher has the potential to disconnect various components at will and demonstrate the operational characteristics at those particular points. The eighteen main components are as follows: 1) condenser; 2) gauge port #1; 3) high pressure service valve; 4) gauge port #2; 5) open/close valve #1; 6) gauge port #3; 7) metering device and evaporator; 8) nitrogen pressure port; 9) gauge port #4; 10) open/close valve #2; 11) gauge port #5; 12) low pressure service valve; 13) gauge port #6; 14) compressor; 15) separation valve; 16) low pressure line; 17) high pressure line; and 18) nitrogen tank.

It should be understood in this description that the maximum effort is being made to make each of the components herein easily removable and re-attachable to the various components in the system. This is being accomplished so as to facilitate the educational experience showing students how to measure pressure in various parts of the system and facilitate an understanding of the operational characteristics thereof.

However, it should be understood that components are optionally brazed together as needed or desired according to the implementation. Thus, it should be clear that when a component is stated as being 'removably attached' it is understood that this is an optional feature that can be replaced with a brazed between the stated components as a AC mechanic or teacher desires. Additionally, it should be clear to the reader that words 'removably attached,' 'removably attachable' or similar language indicates that a flare joint connection (fitting, flare tube and nut) between two components is being contemplated. Additionally, the condenser, evaporator and compressor are simple empty containers.

Beginning at condenser 1 and moving left in the drawing a tube is removably attached to the condenser and to 2 gauge port #1; this port 2 has another tube removably attached thereto leaving it that further removably attaches to high pressure service valve 3. Another tube removably attached to high pressure service valve 3 is removably attached to 4 gauge port #2; this port has another tube removably attached thereto leaving it that further removably attaches to 5 Open/Close valve #1. This valve 5 has another tube removably attached thereto such that this tube also removably attaches to 6 gauge port #3; this port has another tube removably attached thereto leaving it that further removably attaches to an 7 evaporator and metering device.

Pressurized nitrogen is added into the system utilizing a pressurized nitrogen tank 18 and its appropriate port connected via tubing to a nitrogen pressure port 8 connection to 7 evaporator and metering device; there is an optional gauge device connected between the tank 18 and the tubing connecting it to the evaporator 7. The evaporator and metering device 7 has another tube removably attached thereto that is also removably attached to a 9 gauge port #4; similarly, this port has another tube removably attached thereto leaving it that further removably attaches to 10 Open/Close valve #2.

This valve 10 has another tube removably attached thereto such that this tube also removably attaches to 11 gauge port #5; this port 11 has another tube removably attached thereto leaving it that further removably attaches to low pressure service valve 12. This valve 12 has another tube removably attached thereto such that this tube also removably attaches to 13 gauge port #6; this port 13 has another tube removably attached thereto leaving it that further removably attaches to compressor 14. A separation valve 15 is removably attached to both the compressor 14 and to condenser 1.

Finally, it should be understood by the reader that the low pressure side 16 of the system is generally considered from the evaporator 7 all the way to the point whereby a tube connects to the compressor 14 (not including the compressor) that also connects to 13 gauge port #6. Similarly, it should be understood by the reader that the high pressure side 17 of the system is generally considered from the compressor 14 all the way to the connection of a tube to the metering device and following evaporator 7 (not including the evaporator) that also connects to 6 gauge port #3.

A Simulator for Air Conditioning System as taught in this disclosure provides the ability for training having various modes of operation including but not limited to: Recovery, Recycle, Vacuuming, Standing Pressure Test, as well as Charging System. A standing pressure test follows the following operational procedures:

Standing Pressure Test

In the standing pressure test, a user is encouraged to test the pressurization throughout the system by maintaining a constant applied pressure therethrough. Generally speaking, the test comprises turning the following valves into an open position such that the following valves are deemed to be in an OPEN condition: 5 Open/Close Valve #1; 10 Open/Close Valve#2; Separation Valve-15; 3 High Pressure Service Valve; 12 Low Pressure Service Valve. Of course, the manifold is connected appropriately as follows so as to make measurements.

You should apply about 2 psig of Trace refrigerant (permitted only R-22), then apply nitrogen from high pressure nitrogen tank up to 150 psig as discussed down below. This will insert "trace gas" to be able to detect leakages during Standing Pressure test.

1) First, the nitrogen pressure tank is connected to yellow (Central 'testing') hose of the gauge manifold keeping the manifold valves in closed position. Connect the blue hose (Low pressure) gauge of the manifold to the port of Low pressure service valve #12. 2) A user then must connect the red hose (high pressure) gauge of the manifold to the port of high pressure service valve #3.

3) Then one opens the pressure release valve #8 (otherwise known as nitrogen pressure port) connected to nitrogen pressure tank (not shown), and adjusts the release pressure from Nitrogen Tank to 150 psig using a gauge device connected at valve #8. Adding about 2 psig of refrigerant up to 150 psig (max for standing pressure test). 4) Next, a user opens valves on Manifold that are connected to Low and High Pressure Lines of the Simulator. As can easily be appreciated, all gauges should indicate 150 psig since the valves are all opened and the fluid of the trace gas permeating the system should be at this constant pressure.

5) The student should detect no change in the metered pressure for at least one hour. If there is a change in pressure in any part of the system then a leak has been detected. However, if the the pressure is stable at 150 psig at the various gauge ports (2, 4, 6, 9, 11, 13) then there is no leakage detected system wide.

Recovery System

A recovery of fluids/gases in the system involves removing these from the system until a vacuum condition exists therein. To accomplish this goal, a student must ensure that his system is operational and stable without any leaks. Thus, to begin a student operator must apply all steps described in Standing Pressure test. Next valve #5 is closed and the position of the Low Pressure Valve #12 is placed into a 'Back Seat Position' to separate The Low and High Pressure Lines.

The following values are exemplary values and similar values may be used to achieve the same ends. Using the Manifold Valves adjust the pressure on Low Pressure Line, '16' to 70 psig then adjust the pressure on High Pressure Line, '17' to 280 psig with nitrogen. Next, a user must close the Pressure Release Valve #8 and on Nitrogen Pressure Tank. After that, a user should close both valves of the manifold and connect the Yellow Hose to a useful recovery tank or in our Educational System to the atmosphere as we are venting only nitrogen gas.

Finally, one opens both valves of the manifold to recovery system thereby venting to the atmosphere and therefore all gauges should detect a pressure of 0 psig. The zero pressure reading on all gauges indicates that education system has completely released the fluid to the atmosphere and ordinary atmospheric pressure is being read. Thus, there should be no pressurized nitrogen in this simulation system; in other words, there is no Nitrogen within the components herein above atmospheric pressure.

To complete the operation one opens the separation valve #15 and connect the yellow hose of the manifold to a convenient vacuum pump and starts to vacuum the system to the level of 250 microns of mercury (in a vacuum). If all is working well then all the pressure gauges should show the same readings. If this vacuum level was achieved then the system is completely recovered.

Charging System

In this educational system nitrogen is being utilized instead of refrigerant so that when we are describing charging of the system it should be understood that what is meant is the increase of nitrogen therein. In order to charge the system one must provide all steps described on 'Standing Pressure Test' and 'Recovery System' using this educational device and nitrogen gas.

Partial Recovery

In order to fully appreciate the various parts of the system, one would like to separate different parts of the Educational Demonstration System without the necessity of doing a complete System Recovery. A complete System Recovery is required for existing systems technology as local, state, regional and national laws maintain protection for various environmental issues such as protection of nature and the ozone layer. Thus, the instant Educational Demonstration System described herein provides for an environmentally friendly way of accessing and removing partial system components without doing a full system recovery because it is capable of using environmentally friendly Nitrogen as opposed to refrigerants that could contain chlorine.

To accomplish the goal of isolating and inspecting different components various Open/Close and Service Valves configuration are configurable so as to effect separation and removal of the indicated component for individual inspection. In order to accomplish, this a user closes various valves and unscrews the threaded ends of the tubes connected to the indicated component and to these valves thereby removing the component from the system for inspection. Thus, a student user would want to routinely separate and remove the following components:

7 Evaporator with Metering Device (close Valves 5, 10, Open Close Valves #1, #2).
1 Condenser (close valves 15, 3, Separation Valve, High Pressure Service Valve).
14 Compressor (close valves 15, 12, Separation Valve, Low Pressure Service Valve).

17 High Pressure 'Stub' Line (close valves 3, 5, High Pressure Service Valve, Open Close Valve #1).

16 Low Pressure 'Stub' Line (close valves 12, 10, Low Pressure Service Valve, Open Close Valve #2).

What is claimed is:

1. An air conditioner educational system comprising:
   a pseudo condenser removably attachable to
   a pseudo evaporator through
   a first valve removably connected to the pseudo condenser and to the pseudo evaporator through associated tubing;
   a pseudo compressor removably connected to the pseudo condenser through associated tubing; and wherein
   a nitrogen tank is removably connected to the evaporator through a port on the pseudo evaporator, and is configured to add pressurized nitrogen to the system.

2. The air conditioner educational system of claim 1, further comprising:
   a second valve connecting the pseudo compressor to the pseudo condenser and wherein the pseudo compressor is removably attachable to the pseudo evaporator through a third valve and associated tubing.

3. The air conditioner educational system of claim 2, wherein the system further comprises:
   a fourth valve removably connected to the third valve and removably connected to the pseudo evaporator through associated tubing.

4. The air conditioner educational system of claim 2, further comprising:
   a first gauge port connected between the third valve and the pseudo compressor through associated tubing.

5. The air conditioner educational system of claim 4, further comprising:
   a second gauge port connected between the fourth valve and the pseudo compressor through associated tubing.

6. The air conditioner educational system of claim 1, further comprising:
   a second valve removably connected to the first valve and to the pseudo evaporator.

7. The air conditioner educational system of claim 6, further comprising:
   a first gauge port removably connected between the pseudo condenser and the first valve through associated tubing.

8. The air conditioner educational system of claim 7, further comprising:
   a second gauge port removably connected between the first valve and the second valve through associated tubing.

9. The air conditioner educational system of claim 8, further comprising:
   a third gauge port removably connected between the second valve and the pseudo evaporator through associated tubing.

10. The air conditioner educational system of claim 2, further comprising:
    a fourth valve removably connected to the third valve and to the pseudo evaporator.

11. The air conditioner educational system of claim 10, further comprising:
    a first gauge port removably connected between the pseudo compressor and the third valve through associated tubing.

12. The air conditioner educational system of claim 11, further comprising:
    a second gauge port removably connected between the third valve and the fourth valve through associated tubing.

13. The air conditioner educational system of claim 12, further comprising:
    a third gauge port removably connected between the fourth valve and the pseudo evaporator through associated tubing.

14. An air conditioner educational system comprising:
    a simple empty container compressor removably attachable to
    a simple empty container evaporator through
    a first valve removably connected to the simple empty container compressor and to the simple empty container evaporator through associated tubing;
    a simple empty container condenser removably connected to the simple empty container compressor through associated tubing; and wherein
    a nitrogen tank is removably connected to the evaporator through a port on the simple empty container evaporator, and is configured to add pressurized nitrogen to the system.

15. The air conditioner educational system of claim 14, further comprising:
    a second valve connecting the simple empty container condenser to the simple empty container compressor and wherein the simple empty container condenser is removably attachable to the simple empty container evaporator through a third valve and associated tubing.

16. The air conditioner educational system of claim 15, wherein the system further comprises:
    a fourth valve removably connected to the third valve and removably connected to the simple empty container evaporator through associated tubing.

17. The air conditioner educational system of claim 16, further comprising:
    a first gauge port connected between the third valve and the simple empty container condenser through associated tubing.

18. The air conditioner educational system of claim 17, further comprising:
    a second gauge port connected between the third valve and the fourth valve through associated tubing.

19. The air conditioner educational system of claim 18, further comprising:
    a third gauge port connected between the fourth valve and to the simple empty container evaporator through associated tubing.

20. An air conditioner educational system comprising:
    an inoperative pretend condenser;
    an inoperative pretend compressor;
    and an inoperative pretend evaporator; such that
    the inoperative pretend condenser is removably connected through associated tubing to the inoperative pretend evaporator and removably connected through associated tubing to the inoperative pretend compressor; and wherein
    a nitrogen tank is removably connected to the evaporator through a port on the inoperative pretend evaporator, and is configured to add pressurized nitrogen to the system.

* * * * *